(12) United States Patent
Chiasson

(10) Patent No.: US 7,532,796 B2
(45) Date of Patent: May 12, 2009

(54) FIBER OPTIC RIBBONS HAVING ONE OR MORE PREDETERMINED FRACTURE REGIONS

(75) Inventor: David W. Chiasson, Edmonton (CA)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/540,980

(22) Filed: Sep. 29, 2006

(65) Prior Publication Data
US 2008/0080822 A1    Apr. 3, 2008

(51) Int. Cl.
G02B 6/44    (2006.01)
(52) U.S. Cl. ..................................... 385/114
(58) Field of Classification Search ............... None
See application file for complete search history.

(56) References Cited

U.S. PATENT DOCUMENTS

| | | | |
|---|---|---|---|
| 4,547,040 A | 10/1985 | Yamamoto et al. | 350/96.34 |
| 4,653,852 A | 3/1987 | Suzuki et al. | 350/96.33 |
| 4,680,423 A * | 7/1987 | Bennett et al. | 174/36 |
| 4,752,112 A | 6/1988 | Mayr | 350/96.23 |
| 4,861,135 A * | 8/1989 | Rohner et al. | 385/114 |
| 4,900,126 A | 2/1990 | Jackson et al. | 350/46.23 |
| 5,442,722 A | 8/1995 | DeCarlo | 385/114 |
| 5,457,762 A | 10/1995 | Lochkovic et al. | 385/114 |
| 5,524,164 A | 6/1996 | Hattori et al. | 385/114 |
| 5,598,498 A | 1/1997 | Comezzi | 385/114 |
| 5,673,352 A | 9/1997 | Bauer et al. | 385/114 |
| 5,717,805 A | 2/1998 | Stulpin | 385/114 |
| 5,761,363 A | 6/1998 | Mills | 385/114 |
| 5,905,835 A | 5/1999 | Bourghelle et al. | 385/114 |
| 5,933,559 A | 8/1999 | Petisce | 385/114 |
| 5,970,196 A | 10/1999 | Greveling et al. | 385/114 |
| 5,982,968 A * | 11/1999 | Stulpin | 385/114 |

(Continued)

FOREIGN PATENT DOCUMENTS

EP    0843187 A1    5/1998

(Continued)

OTHER PUBLICATIONS

N. Andrew Punch, Jr., Shail Moorjani, Steven T. Bissell, and Karen E. Williams, Craft-Friendly 24-Fiber Ribbon Design, IWCS 1999, pp. 72-78.

(Continued)

*Primary Examiner*—Sung H Pak
*Assistant Examiner*—Chad H Smith
(74) *Attorney, Agent, or Firm*—C. Keith Montgomery

(57) ABSTRACT

A fiber optic ribbon having one or more fracture locations for influencing the separation of the same at predetermined locations is disclosed. The fiber optic ribbon includes a plurality of optical fibers held together by a primary matrix. The primary matrix includes a first fracture region for splitting the optical fiber ribbon into a plurality of optical fiber subsets. The first fracture region is defined by a first group of preferential tear features that protrude beyond a major primary matrix plane, thereby forming a first local minimum thickness between adjacent optical fibers. The first local minimum thickness enables splitting of the fiber optic ribbon into subsets at the first local minimum thickness, thereby allowing the craft to separate the fiber optic ribbon into subsets without using tools. Additionally, fiber optic ribbons of the invention may include a secondary matrix.

30 Claims, 4 Drawing Sheets

U.S. PATENT DOCUMENTS

| | | | |
|---|---|---|---|
| 6,018,605 A | 1/2000 | Mills et al. | 385/114 |
| 6,028,976 A | 2/2000 | Sato et al. | 385/114 |
| 6,097,866 A | 8/2000 | Yang et al. | 385/114 |
| 6,253,013 B1 | 6/2001 | Lochkovic et al. | 385/114 |
| 6,309,567 B1 | 10/2001 | Okuno et al. | 264/1.27 |
| 6,337,941 B1 | 1/2002 | Yang et al. | 385/114 |
| 6,381,390 B1 | 4/2002 | Hutton et al. | 385/114 |
| 6,600,859 B2 * | 7/2003 | Chandraiah et al. | 385/114 |
| 6,731,844 B2 | 5/2004 | Conrad et al. | 385/114 |
| 6,792,184 B2 | 9/2004 | Conrad et al. | 385/114 |
| 6,801,695 B2 | 10/2004 | Lanier et al. | 385/100 |
| 6,853,783 B2 * | 2/2005 | Chiasson et al. | 385/114 |
| 7,085,459 B2 | 8/2006 | Conrad et al. | 385/114 |
| 2002/0025128 A1 | 2/2002 | Hwang | 385/114 |
| 2004/0223709 A1 * | 11/2004 | Conrad et al. | 385/114 |

FOREIGN PATENT DOCUMENTS

| | | |
|---|---|---|
| EP | 0856761 | 8/1998 |
| EP | 0856761 A1 | 8/1998 |
| EP | 0749129 | 5/2000 |
| EP | 0749129 B1 | 5/2000 |
| JP | 1-138517 | 5/1989 |
| JP | 1-138518 | 5/1989 |
| JP | 1-251005 | 10/1989 |
| JP | 07-120645 | 5/1995 |
| JP | 07120645 A | 5/1995 |
| JP | 08-129122 | 5/1996 |
| JP | 08129122 A | 5/1996 |
| JP | 08-262292 | 10/1996 |
| JP | 08262292 A | 10/1996 |
| JP | 09-113773 | 5/1997 |
| JP | 09113773 A | 5/1997 |
| JP | 09-197213 | 7/1997 |
| JP | 09197213 A | 7/1997 |
| JP | 09-218328 | 8/1997 |
| JP | 09218328 A | 8/1997 |
| WO | 94/23323 | 10/1994 |
| WO | WO94/23323 | 10/1994 |
| WO | 97/05515 | 2/1997 |
| WO | WO97/05515 | 2/1997 |

OTHER PUBLICATIONS

R.S. Wagman, G.A. Lochkovic, K.T. White, "Component Optimization for Slotted Core Cables Using 8-Fiber Ribbons", IWCS 1995, pp. 472-478.

Patent Cooperation Treaty, International Search Report for PCT/US2007/20708, Mar. 19, 2008, 1 page.

* cited by examiner

FIBER OPTIC RIBBONS HAVING ONE OR MORE PREDETERMINED FRACTURE REGIONS

FIELD OF THE INVENTION

The present invention relates generally to fiber optic ribbons. More specifically, the present invention relates to fiber optic ribbons having one or more fracture regions at predetermined locations for splitting the fiber optic ribbon into subsets of optical fibers.

BACKGROUND OF THE INVENTION

Fiber optic ribbons include optical waveguides such as optical fibers that transmit optical signals, for example, voice, video, and/or data information. Fiber optic cables using fiber optic ribbons can result in a relatively high optical fiber-density. Fiber optic ribbon configurations can be generally classified into two general categories. Namely, fiber optic ribbons with subunits and those without. A fiber optic ribbon with a subunit configuration, for example, includes at least one optical fiber surrounded by a primary matrix forming a first subunit, and a second subunit having a similar construction (with its own discreet primary matrix), which are connected and/or encapsulated by a secondary matrix. On the other hand, fiber optic ribbons without subunits generally have a plurality of optical fibers surrounded by a single primary matrix material.

Optical fiber ribbons should not be confused with microcables that, for example, have a strength member and a jacket. For instance, U.S. Pat. No. 5,673,352 discloses a micro-cable having a core structure and a jacket. The core structure requires that at least one optical fiber is positioned between longitudinally extending strength members, both of which are embedded in a buffer material. The jacket of the '352 patent protects the core structure and the material is selected to have good adhesion to the buffer material and be abrasion resistant. Additionally, the strength members are required to have a larger diameter than the diameter of the optical fiber, thereby absorbing crushing forces that are applied to the microcable.

On the other hand, optical fiber ribbons generally have a plurality of adjacent optical fibers arranged in a generally planar array forming a relatively high optical fiber density with a relatively small cross-sectional footprint. Optical fiber ribbons without subunits can present problems for the craft. For example, when separating these optical fiber ribbons into a plurality of optical fiber subsets, the craft must use expensive precision tools for "cleanly" separating the optical fiber ribbon. Where the craft elects to separate the optical fiber ribbon into subsets by hand, or with a tool lacking adequate precision, stray optical fibers and/or damage to the optical fibers can result. Stray optical fibers can cause problems in optical ribbon connectorization, organization, stripping, and splicing. Furthermore, damage to the optical fibers is undesirable and can render the optical fiber inoperable for its intended purpose.

However, there are fiber optic ribbon configurations that attempt to aid the separation of fiber optic ribbons without using subunits. For example, U.S. Pat. No. 5,982,968 requires an optical fiber ribbon of uniform thickness having V-shaped stress concentrations in the matrix material that extend along the longitudinal axis of the fiber optic ribbon. V-shaped stress concentrations can be located across from each other on the planar surfaces of the fiber optic ribbon, thereby aiding the separation of the fiber optic ribbon into a plurality of subsets. However, the '968 patent requires a wider fiber optic ribbon because additional matrix material is required adjacent to the optical fibers near the V-shaped stress concentrations to avoid stray optical fibers after separation. A wider ribbon requires more matrix material and decreases the optical fiber density. Moreover, this wider spacing complicates mass fusion splicing of the entire fiber optic ribbon. Simply stated, the optical fibers of the wider ribbon do not have a uniform spacing like a conventional fiber optic ribbon and, thus, the spacing does not match the spacing for a conventional chuck of the fusion splicer. Another embodiment of the '968 patent requires applying a thin layer of a first matrix material around optical fibers to improve geometry control such as planarity of the optical fibers. Then V-shaped stress concentrations are formed in a second matrix applied over the first matrix material, thereby allowing separation of the subsets at the stress concentrations.

Another example of a separable fiber optic ribbon is described in U.S. Pat. No. 5,970,196. More specifically, the '196 patent requires a pair of removable sections positioned in V-shaped notches located across from each other on opposite sides of the planar surfaces of an optical fiber ribbon. The removable sections are distinct from the primary matrix and are positioned between adjacent interior optical fibers of the optical fiber ribbon to facilitate the separation of the optical fiber ribbon into subsets at the V-shaped notches. The removable sections can either be flush with the planar surfaces of the optical fiber ribbon, or they may protrude therefrom. These known fiber optic ribbons have several disadvantages. For example, they can be more expensive and difficult to manufacture because of the added complexity of the distinct removable sections. Additionally, from an operability standpoint, the V-shaped stress concentrations and/or V-shaped notches can undesirably affect the robustness of the optical fiber ribbon and/or induce microbending in the optical fibers.

Optical fiber ribbons having subunits can have several advantages, for example, improved separation, and avoidance of stray fiber occurrences. A conventional optical fiber ribbon 1 employing subunits encapsulated in a secondary matrix is shown in FIG. 1. In particular, optical fiber ribbon 1 includes a pair of conventional subunits 2 having optical fibers 3 encapsulated in a primary matrix 5, which are then encapsulated in a secondary matrix 4. The thickness T1 of primary matrix 5 is continuous and uniform. Likewise, the thickness t1 of the secondary matrix 4 covering the planar portions of subunits 2 is continuous and uniform. For example, subunit 2 can include six 250 µm optical fibers 3 disposed in primary matrix 5 having an overall uniform thickness T1 of 310 µm and secondary matrix 4 has a thickness t1 of 10 µm for an overall fiber optic ribbon thickness T2 of 330 µm.

However, conventional optical fiber ribbon 1 having subunits 2 has disadvantages. For example, one concern is the potential formation of wings W (FIG. 1) during hand separation of subunits 2. Wings W can be caused by, for example, a lack of sufficient adhesion between common matrix 4 and subunit matrix 5 and/or random fracturing of the secondary matrix during separation. The existence of wings W can negatively affect, for example, optical ribbon organization, connectorization, stripping, and/or splicing operations by the craft. Additionally, wings W can cause problems with ribbon identification markings, or compatibility of the subunit with ribbon handling tools, for example, thermal strippers, splice chucks, and fusion splicers. Furthermore, the abutting subunits can increase the spacing between the adjacent optical fibers of the subunits. Thus, the spacing of the optical fibers of the subunitized ribbon does not match the spacing for a conventional chuck of the fusion splicer The present invention is directed to optical fiber ribbons having one or more fracture regions at predetermined locations for splitting the ribbon into subsets of optical fibers while maintaining a uniform spacing for the optical fibers.

SUMMARY OF THE INVENTION

The present invention is directed to fiber optic ribbons having one or more fracture locations for influencing the separation of the same at predetermined locations. The fiber optic ribbons include a plurality of optical fibers held together by a primary matrix. Moreover, the optical fibers of the ribbon have the same spacing as a conventional ribbon and, thus, can be mass fusion spliced using conventional splice chucks having a standard spacing. In one embodiment, the primary matrix has a first fracture region for splitting the optical fiber ribbon into a plurality of optical fiber subsets. The first fracture region is defined by a first group of preferential tear features, where the first group of preferential tear features protrude beyond a major primary matrix plane. The first group of preferential tear features form a first local minimum thickness between adjacent optical fibers that enable splitting the fiber optic ribbon into subsets at the first local minimum thickness. Consequently, the craft can split the fiber optic ribbon into subsets without using tools.

Another aspect of the present invention is directed to a fiber optic ribbon having one or more fracture location for influencing the separation of the same at predetermined locations. The primary matrix of this ribbon has a first fracture region for splitting the optical fiber ribbon into a plurality of optical fiber subsets. The first fracture region is defined by a first group of preferential tear features that includes at least two protrusions that extend beyond one of two major primary matrix planes. The at least two protrusions form a first local minimum thickness between adjacent optical fibers that enable splitting the fiber optic ribbon into subsets at the first local minimum thickness. Additionally, the at least two protrusions are disposed on opposite sides of the first local minimum thickness.

The present invention is also directed to a fiber optic ribbon having one or more fracture locations for influencing the separation of the fiber optic ribbon at predetermined locations. The primary matrix has a first fracture region for splitting the optical fiber ribbon into a plurality of optical fiber subsets where the first fracture region is defined by a first group of preferential tear features. The fiber optic ribbon further includes a secondary matrix. The secondary matrix may form one or more generally planar surfaces at the major planes of the fiber optic ribbon.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain principals and operations of the invention.

DETAILED DESCRIPTION OF THE INVENTION

Figure 1:
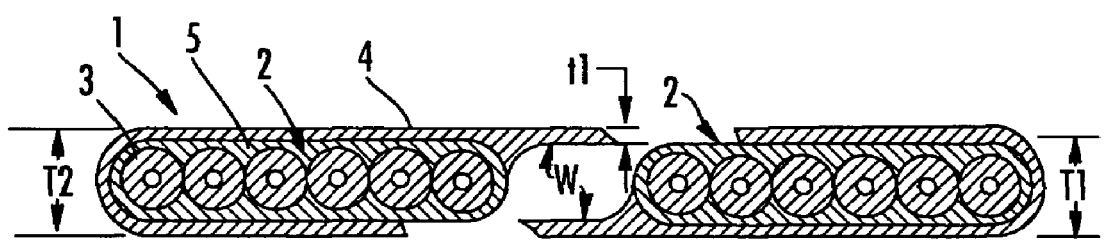
FIG. 1 depicts a cross-section of a conventional fiber optic ribbon having subunits.
Figure 2:
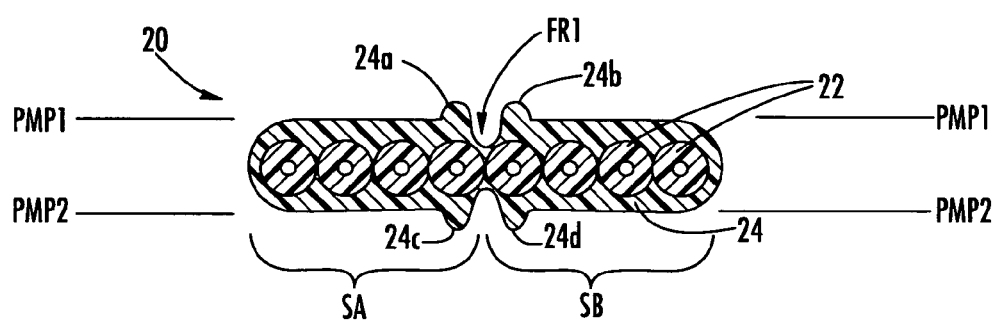
FIG. 2 is a cross-sectional view of a fiber optic ribbon according to the present invention.

Reference will now be made in detail to the present preferred embodiments of the invention, examples of which are illustrated in the accompanying drawings. Whenever practical, same reference numerals will be used throughout the drawings to refer to the same or like parts. FIG. 2 depicts a cross-sectional view of a fiber optic ribbon 20 according to the present invention. Fiber optic ribbon 20 has at least one fracture location FR1 for influencing the separation of a primary matrix 24 of the optical fiber ribbon into a plurality of optical fiber subsets at a predetermined location. Specifically, fiber optic ribbon 20 includes a plurality of optical fibers 22 held together by primary matrix 24 in a generally planar configuration forming an elongate structure with a generally uniform spacing for optical fibers 22. Generally speaking, optical fibers 22 are generally abutting, thereby imparting an optical fiber spacing that matches a conventional fusion splicing chuck. Primary matrix 24 generally contacts optical fibers 22 and may encapsulate the same, thereby providing a robust structure for processing and handling. Primary matrix 24 includes first fracture region FR1 for splitting the optical fiber ribbon into a first optical fiber subset SA and a second optical fiber subset SB. First fracture region FR1 is defined by a first group of preferential tear features 24a, 24b, 24c, 24d. Preferential tear features 24a, 24b, 24c, 24d protrude beyond one of a plurality of major primary matrix planes at a medial portion of the fiber optic ribbon 20, thereby forming a first local minimum thickness T1 (see FIG. 3) between adjacent optical fibers. First local minimum thickness T1 enables reliable hand separation of fiber optic ribbon 20 into first subset SA and second subset SB at the first local minimum thickness T1. More specifically, preferential tear features 24a and 24b protrude beyond a first major primary matrix plane PMP1 and preferential tear features 24c and 24d protrude beyond a second major primary matrix plane PMP2, thereby creating a relatively large primary matrix thickness gradient between interface optical fibers 22I (i.e., a fourth and a fifth optical fiber of fiber optic ribbon 20). This relatively large primary thickness gradient influences the initiation the fracture of primary matrix 24 during separation at the desired fracture location between interface optical fibers 12I. Simply stated, fracture region FR1 includes a valley disposed between the protrusions for influencing the initiation of the primary matrix fracture between the interface optical fibers.

Figure 3:
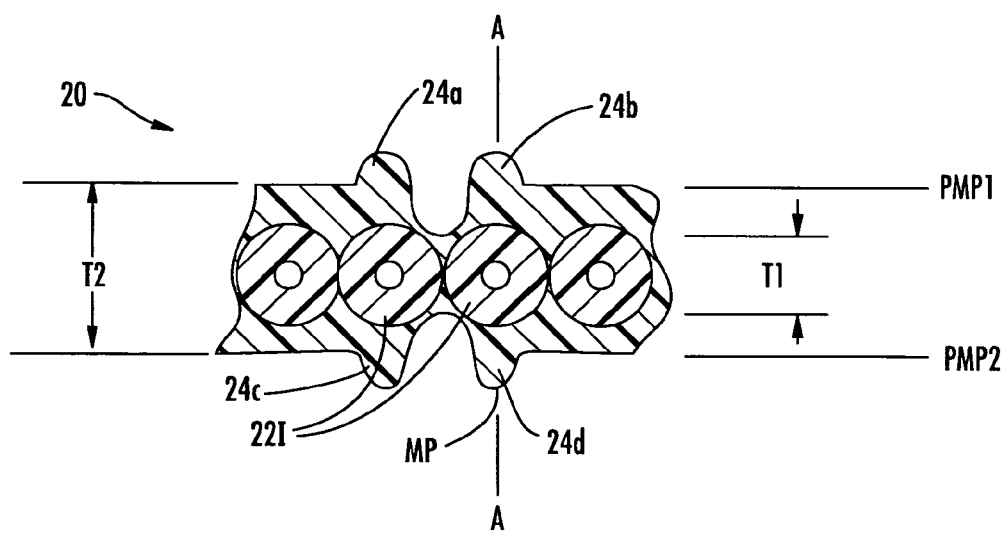
FIG. 3 is a partial enlarged view of the fiber optic ribbon of FIG. 2 showing the fracture region in greater detail.

As best shown in FIG. 3, first fracture region FR1 employes local minimum thickness T1 that is less than a nominal thickness T2 of fiber optic ribbon 20. Illustratively, local minimum thickness T1 is smaller than nominal thickness T2 by about 5 microns or more. Nominal thickness T2 of the fiber optic ribbon is defined as the thickness between the first major primary matrix plane PMP1 and the second major primary matrix plane PMP2 of the fiber optic ribbon. By way of example for explanatory purposes, optical fibers 22 may have a nominal diameter of about 250 microns and nominal thickness T2 of fiber optic ribbon is about 310 microns for generally maintaining the planarity of optical fibers 22 and local minimum thickness is about 230 microns. Additionally, preferential tear features 24a, 24b, 24c, 24d protrude beyond respective major primary matrix planes PMP1 and PMP2 by about 3 microns or more, such as about 5 microns, but may protrude up to 50 microns or more. Consequently, the craft can easily and cleanly (i.e., inhibiting the formation of wings in the primary matrix) separate fiber optic ribbon 20 into subsets SA, SB by hand near local minimum thickness T1 of primary matrix 24. Of course, the concepts of the present invention are suitable for use with fiber optic ribbons having other dimensions and/or structures.

Preferential tear features 24a,24b,24c,24d are shown as generally convex profiles, but may have any suitable profile such as rectangular or angular for creating the desired fracture region and/or separation characteristics. Furthermore, the preferential tear features have a maximum protrusion MP that is generally disposed above an interface optical fiber 22I. In other words, a line A-A drawn vertically through the maximum protrusion MP intersects a portion of the interface optical fiber 22I. Simply stated, preferential tear features may include any combination of suitable shape, maximum protrusion MP, and/or local minimum thickness T1 using the concepts of the invention that influences the fracture of the primary matrix for separation into subsets. Fiber optic ribbon 20 is advantageous since it allows a conventional spacing among the optical fibers such as between the interface optical fibers 22I (and the edge optical fibers), thereby allowing mass fusion splicing of same using standard splice chucks with the fusion splicer. Stated another way, optical fibers 12 of fiber optic ribbon 20 can be positioned closely together (i.e., abutting arrangement) while still influencing the initiation of the fracture of the primary matrix at a predetermined location during hand separation. For instance, fiber optic ribbon 20 is configured for hand splitting into two subsets each having four optical fibers. Of course, fiber optic ribbons of the present invention could have other suitable numbers of subsets and/or optical fibers per subset.

The concepts of the present invention should not be confused with conventional ribbons that may have undulations across their cross-sectional surface due to manufacturing variations. These undulations can cause variations in the conventional ribbon thickness at random locations, rather than, for instance, predetermined shapes. For example, the thickness of the conventional ribbon can be 310±3 microns at random locations across the cross-section. On the other hand, ribbons according to the present invention have fracture regions at predetermined medial portions of the primary matrix for influencing fracture of the primary matrix between interface optical fibers. Likewise, the present invention should not be confused with fiber optic ribbons that use subunits for providing separation since the fracture regions of the present invention are disposed in the primary matrix.

Fiber optic ribbons of the present invention are also advantageous compared with fiber optic ribbons using subunits for other reasons. For instance, the print statements on fiber optic ribbons of the present invention may have less distortion. Typically, print statements are placed on the primary matrix for durability purposes (i.e., the print statement is covered by the secondary matrix material and cannot be rubbed off). Consequently, fiber optic ribbons having subunits place the print statement on two adjacent subunits that are not yet connected by the secondary matrix, thus, the print statement becomes distorted at the region between subunits since the ink falls between the subunits. On the other hand, the primary matrix of fiber optic ribbons of the present invention is continuous, thereby providing a surface for the ink and inhibiting distortion of the print statement.

Primary matrix 24 may be, for instance, a radiation curable material or a polymeric material; however, other suitable materials are possible. By way of example, one suitable UV curable material is a polyurethane acrylate resin commercially available such as sold under the tradename 950-706 by DSM Desotech, Inc. of Elgin, Ill. Of course, other suitable UV materials are possible such as polyester acrylate resins that are commercially available from Borden Chemical, Inc. of Columbus, Ohio. As known, the degree of cure (i.e., cross-link density) affects the mechanical characteristics of the radiation curable material. For example, a significantly cured material can be defined as one with a high cross-link density for the material, which can be too brittle. Further, an undercured material can be too soft and possibly have a relatively high coefficient of friction (COF) that causes an undesirable level of ribbon friction. The cured UV material has a modulus in the range of about 50 MPa and about 1500 MPa depending on the radiation dose. Different modulus values can provide varying degrees of performance with respect to characteristics such as hand separability and robustness of the ribbons. Additionally, thermoplastic materials such as polypropylene are possible as a matrix material.

Figure 4:
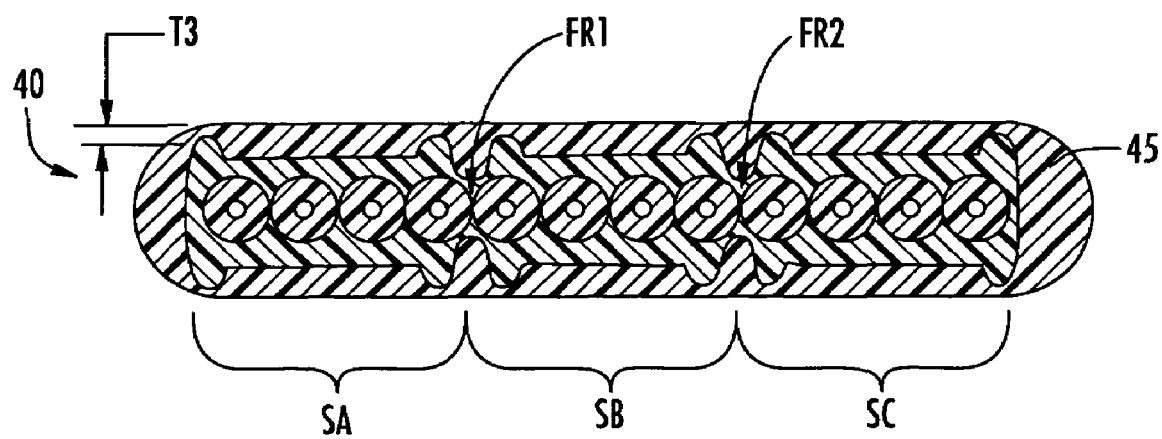
FIG. 4 is a cross-sectional view of another fiber optic ribbon according to the present invention.

Variations on the concepts of the present invention are possible. For instance, FIG. 4 depicts a cross-sectional view of another fiber optic ribbon 40 according to the present invention. Fiber optic ribbon 40 is similar to fiber optic ribbon 20, but primary matrix 42 includes a first fracture region FR1 and a second fracture region FR2 and further includes a secondary matrix 45. Using two fracture regions allows the craft to split fiber optic ribbon 40 into three subsets SA, SB, and SC. More specifically, fiber optic ribbon 40 includes twelve optical fibers 22 disposed in primary matrix 42 and each of the subsets includes the same number of optical fibers 22 (i.e., each subset SA, SB, and SC has four optical fibers 22). Also, fiber optic ribbon 40 includes protrusions (not numbered) adjacent the edge optical fibers 22e for manufacturing control. In other words, having protrusions at the far ends of primary matrix 42 aids in guiding the fiber optic ribbon into secondary coating die. Of course, other optical fiber ribbons can include any desirable number optical fibers, subsets, and/or optical fibers per subset.

Fiber optic ribbon 40 also includes secondary matrix 45. As shown, secondary matrix 45 imparts a generally planar surface for fiber optic ribbon 40, thereby allowing for stacking of the fiber optic ribbons for providing a dense array of optical fibers. Simply stated, using a secondary matrix advantageously allows the formation of relatively flat major surfaces of fiber optic ribbon 40 while still providing the desired separation characteristics. Additionally, secondary matrix 45 has a plurality of minimum local thicknesses T3 located adjacent to the fracture regions due to the protrusions (not numbered) of the primary matrix. Local minimum thickness T3 of secondary matrix 45 is about 10 microns or less, but other suitable dimension are possible. Consequently, the fracture of secondary matrix 45 initiates at this local minimum thickness T3 of secondary matrix 45 and the forces applied during separation are then directed to fracture region of the primary matrix during hand separation.

Figure 5:
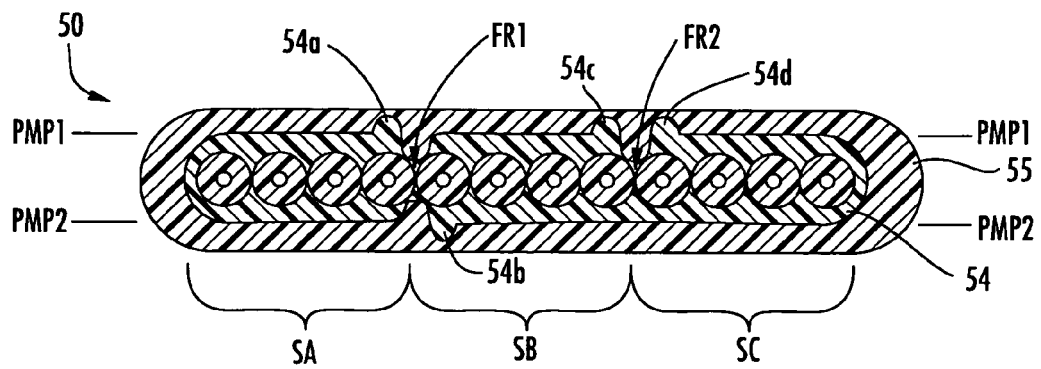
FIG. 5 is a cross-sectional view of an explanatory fiber optic ribbon according to the present invention.

Furthermore, fiber optic ribbons of the present invention can have configurations for the fracture region that differ from those shown in FIG. 2. By way of example, FIG. 5 depicts a cross-sectional view of an explanatory fiber optic ribbon 50 according to the present invention. More specifically, fiber optic ribbon 50 has a primary matrix 54 including first fracture region FR1 and second fracture region FR2 with different configurations, thereby allowing separation into a plurality of subsets SA, SB, and SC. Stated another way, fiber optic ribbon 50 has two groups of preferential tear features, i.e., one group for each fracture region. As shown, first fracture region FR1 of fiber optic ribbon 50 has two protrusions 54a and 54b, instead of the four protrusions as depicted in fiber optic ribbon 20. Protrusions 54a and 54b are disposed on opposite sides of primary matrix 54 so that protrusion 54a extends beyond first major primary matrix plane PMP1 and protrustion 54b extends beyond second major primary matrix plane PMP2. Furthermore, first fracture region FR1 forms a local minimum thickness (not labeled) between the fourth and fifth optical fibers, which is smaller than a nominal thickness (not labeled) of primary matrix 54. Like first fracture region FR1, second fracture region FR2 of fiber optic ribbon includes two protrusions 54c and 54d. However, protrusions 54c and 54d of second fracture region FR2 are disposed on the same side of primary matrix 54 and they both extend beyond first major primary matrix plane PMP1 as shown. Additionally, second fracture region FR2 also forms a local minimum thickness (not labeled) between the eighth and ninth optical fibers, which is smaller than the nominal thickness of primary matrix 54. Fiber optic ribbon 50 also includes a secondary matrix 55 for imparting generally flat major surfaces to fiber optic ribbon 50.

Figure 6:
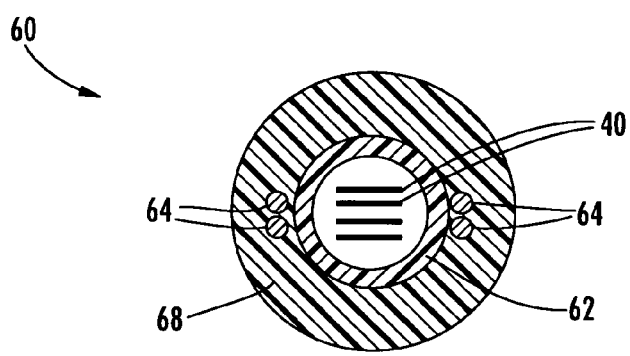
FIGS. 6 and 7 are cross-sectional views of fiber optic cables having fiber optic ribbons according to the present invention.
Figure 7:
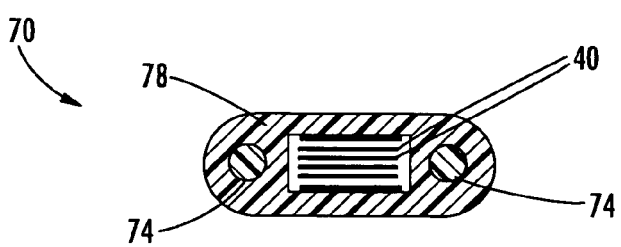

Fiber optic ribbon of the present invention can, for example, be used as a stand alone ribbon, a portion of a ribbon stack, or as a portion of a fiber optic cable. Illustratively, FIG. 6 depicts a cross-sectional view of an explanatory fiber optic cable having a plurality of fiber optic ribbons 40 represented as solid lines. Fiber optic cable 60 houses fiber optic ribbons 40 in a buffer tube 62 that may include a suitable filling material such as a grease, gel, yarn, or one or more dry inserts. Filling materials are useful for providing one or more functions such as cushion, coupling, water-blocking, or the like. Fiber optic cable 60 also includes a plurality of strength members 62 and a cable jacket 68. Of course, fiber optic ribbons may be used in any suitable fiber optic cable. FIG. 7 depicts a tubeless fiber optic cable 70 having a plurality of fiber optic ribbons 40 according to the present invention. Fiber optic cable 70 has a generally rectangular cavity for housing a plurality of optical fiber ribbons 40 and may include one or more filling materials. Strength members 74 provide tensile strength for the cable and cable jacket 78 has a generally flat shape.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A fiber optic ribbon having one or more fracture locations for influencing a separation of the fiber optic ribbon at predetermined locations, the fiber optic ribbon comprising:
   a plurality of optical fibers; and
   a primary matrix, the primary matrix holding all of the plurality of optical fibers together and contacting the plurality of optical fibers, wherein the primary matrix has a first fracture region for splitting the fiber optic ribbon into a plurality of optical fiber subsets, the first fracture region is defined by a first group of preferential tear features, the first group of preferential tear features protruding beyond a major primary matrix plane, thereby forming a first local minimum thickness between adjacent optical fibers that enable splitting the fiber optic ribbon into subsets at the first local minimum thickness, wherein the major primary matrix plane is defined by an exterior surface of the primary matrix, and wherein the fiber optic ribbon further includes a secondary matrix material contacting an exterior surface of the primary matrix.

2. The fiber optic ribbon of claim 1, wherein the first group of preferential tear features protrude about 3 microns or more beyond the major primary matrix plane.

3. The fiber optic ribbon of claim 1, wherein the first local minimum thickness is less than a nominal thickness of the primary matrix.

4. The fiber optic ribbon of claim 1, wherein the first group of preferential tear features includes four protrusions.

5. The fiber optic ribbon of claim 4, wherein the four protrusions are generally symmetrically disposed above the adjacent optical fibers.

6. The fiber optic ribbon of claim 1, wherein the first group of preferential tear features includes at least two protrusions.

7. The fiber optic ribbon of claim 1, wherein the first group of preferential tear features includes at least two protrusions, the two protrusions being disposed on opposite sides of the first local minimum thickness.

8. The fiber optic ribbon of claim 1, wherein the fiber optic ribbon includes a second group of preferential tear features, thereby creating a second local minimum thickness for splitting the fiber optic ribbon into subsets at the second local minimum thickness, thereby providing preferential splitting of the fiber optic ribbon into three optical fiber subsets.

9. The fiber optic ribbon of claim 1, wherein the subsets of the fiber optic ribbon each include the same number of optical fibers.

10. The fiber optic ribbon of claim 1, wherein the secondary matrix has a secondary local minimum thickness of about 10 microns or less.

11. The fiber optic ribbon of claim 1, wherein the fiber optic ribbon is a portion of a fiber optic cable.

12. A fiber optic ribbon having one or more fracture locations for influencing a separation of the fiber optic ribbon at predetermined locations, the fiber optic ribbon comprising:
   a plurality of optical fibers; and
   a primary matrix, the primary matrix holding all of the plurality of optical fibers together and contacting the plurality of optical fibers, wherein the primary matrix has a first fracture region for splitting the fiber optic ribbon into a plurality of optical fiber subsets, the first fracture region is defined by a first group of preferential tear features, the first group of preferential tear features being at least two protrusions that extend beyond one of two major primary matrix planes, thereby forming a first local minimum thickness between adjacent optical fibers that enable splitting the fiber optic ribbon into subsets at the first local minimum thickness, the at least two protrusions being disposed on opposite sides of the first local minimum thickness, wherein the one of the two major primary matrix planes is defined by an exterior surface of the primary matrix, and
   wherein the fiber optic ribbon further includes a secondary matrix contacting an exterior surface of the primary matrix and the secondary matrix has a secondary local minimum thickness of about 10 microns or less.

13. The fiber optic ribbon of claim 12, wherein the at least two protrusions extend about 3 microns or more beyond the one of the two major primary matrix planes.

14. The fiber optic ribbon of claim 12, wherein the first local minimum thickness is less than a nominal thickness of the primary matrix.

15. The fiber optic ribbon of claim 12, wherein the first group of preferential tear features includes four protrusions.

16. The fiber optic ribbon of claim 15, wherein the four protrusions are generally symmetrically disposed above the adjacent optical fibers.

17. The fiber optic ribbon of claim 12, wherein the fiber optic ribbon includes a second group of preferential tear features, thereby creating a second local minimum thickness for splitting the fiber optic ribbon into subsets at the second local minimum thickness, thereby providing preferential splitting of the fiber optic ribbon into three optical fiber subsets.

18. The fiber optic ribbon of claim 12, wherein the subsets of the fiber optic ribbon each include the same number of optical fibers.

19. The fiber optic ribbon of claim 12, wherein the fiber optic ribbon is a portion of a fiber optic cable.

20. A fiber optic ribbon having one or more fracture locations for influencing a separation of the fiber optic ribbon at predetermined locations, the fiber optic ribbon comprising:
a plurality of optical fibers;
a primary matrix, the primary matrix holding all of the plurality of optical fibers together and contacting the plurality of optical fibers, wherein the primary matrix has a first fracture region for splitting the fiber optic ribbon into a plurality of optical fiber subsets, the first fracture region is defined by a first group of preferential tear features, the first group of preferential tear features protruding beyond a major primary matrix plane, thereby forming a first local minimum thickness between adjacent optical fiber that enable splitting the fiber optic ribbon into subsets at the first local minimum thickness, wherein the major primary matrix plane is defined by an exterior surface of the primary matrix; and
a secondary matrix contacting an exterior surface of the primary matrix.

21. The fiber optic ribbon of claim 20, wherein the secondary matrix has a secondary local minimum thickness of about 10 microns or less.

22. The fiber optic ribbon of claim 20, wherein the first group of preferential tear features protrude about 3 microns or more beyond the major primary matrix plane.

23. The fiber optic ribbon of claim 20, wherein the first local minimum thickness is less than a nominal thickness of the primary matrix.

24. The fiber optic ribbon of claim 20, wherein the first group of preferential tear features includes four protrusions.

25. The fiber optic ribbon of claim 24, wherein the four protrusions are generally symmetrically disposed above the adjacent optical fibers.

26. The fiber optic ribbon of claim 20, wherein the first group of preferential tear features includes at least two protrusions.

27. The fiber optic ribbon of claim 20, wherein the first group of preferential tear features includes at least two protrusions, the at least two protrusions being disposed on opposite sides of the first local minimum thickness.

28. The fiber optic ribbon of claim 20, wherein the fiber optic ribbon includes a second group of preferential tear features, thereby creating a second local minimum thickness for splitting the fiber optic ribbon into subsets at the second local minimum thickness, thereby providing preferential splitting of the fiber optic ribbon into three optical fiber subsets.

29. The fiber optic ribbon of claim 20, wherein the subsets of the fiber optic ribbon each include the same number of optical fibers.

30. The fiber optic ribbon of claim 20, wherein the fiber optic ribbon is a portion of a fiber optic cable.

* * * * *